(12) United States Patent
Soltwedel et al.

(10) Patent No.: US 11,908,126 B2
(45) Date of Patent: Feb. 20, 2024

(54) METHOD OF CONTROLLING THE QUALITY OF PRINTED PRODUCTS BY IMAGE INSPECTION FILTERING

(71) Applicant: HEIDELBERGER DRUCKMASCHINEN AG, Heidelberg (DE)

(72) Inventors: Frank Soltwedel, Sinsheim/Hoffenheim (DE); Frank Schumann, Heidelberg (DE); Sascha Epp, Sinsheim-Eschelbach (DE); Volker Felzen, Dielheim (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 303 days.

(21) Appl. No.: 17/351,286

(22) Filed: Jun. 18, 2021

(65) Prior Publication Data
US 2022/0067899 A1 Mar. 3, 2022

(30) Foreign Application Priority Data
Aug. 26, 2020 (DE) ...................... 10 2020 122 263.7

(51) Int. Cl.
*G06T 7/00* (2017.01)
(52) U.S. Cl.
CPC .... *G06T 7/001* (2013.01); *G06T 2207/30144* (2013.01)
(58) Field of Classification Search
CPC ........... G06T 7/001; G06T 2207/30144; G06T 2207/10008; G06T 2207/20224; G01N 2021/9563; G06F 18/22
See application file for complete search history.

(56) References Cited

U.S. PATENT DOCUMENTS

| 6,845,213 B2 | 1/2005 | Vaas et al. |
| 7,664,294 B2 | 2/2010 | Sacher et al. |
| (Continued) | | |

FOREIGN PATENT DOCUMENTS

| DE | 10036882 A1 | 8/2001 |
| DE | 10023270 A1 | 5/2002 |
| (Continued) | | |

OTHER PUBLICATIONS

Vans, Marie et al.: Automatic visual inspection and defect detection on variable data prints. In: Journal of electronic imaging, vol. 20, 2011, No. 1, 1-13.—ISSN 1017-9909.

*Primary Examiner* — Samir A Ahmed
(74) *Attorney, Agent, or Firm* — Laurence A. Greenberg; Werner H. Stemer; Ralph E. Locher (57) ABSTRACT

A method of controlling the quality of printed products by using a computer includes always producing multiple printed products with at least partially identical image content in a printing machine in a course of a print job to be completed. The multiple printed products are recorded by at least one image sensor and are sent to the computer as digital image data. The computer examines and assesses the digital image data in an image inspection process to find print defects and to sort out printed products that have been found to be unusable. The computer assesses the identical image content of the digital image data of at least two consecutive printed products and only takes into consideration such detected print defects that are present on the at least two assessed consecutive printed products.

3 Claims, 5 Drawing Sheets

(56) References Cited

U.S. PATENT DOCUMENTS

| | | |
|---|---|---|
| 2015/0078627 A1 | 3/2015 | Fukase |
| 2019/0246005 A1* | 8/2019 | Fergen ................. H04N 1/4092 |
| 2019/0291409 A1* | 9/2019 | Fergen .................... G06T 7/001 |
| 2019/0335041 A1 | 10/2019 | Haik et al. |
| 2019/0377296 A1 | 12/2019 | Haik et al. |
| 2020/0033783 A1 | 1/2020 | Perry et al. |
| 2020/0169641 A1* | 5/2020 | Schumann ........... G06V 10/751 |
| 2021/0046751 A1 | 2/2021 | Schmidt |

FOREIGN PATENT DOCUMENTS

| | | |
|---|---|---|
| DE | 10319771 A1 | 11/2004 |
| WO | 2018166551 A1 | 9/2018 |
| WO | 2019210899 A1 | 11/2019 |

\* cited by examiner

METHOD OF CONTROLLING THE QUALITY OF PRINTED PRODUCTS BY IMAGE INSPECTION FILTERING

CROSS-REFERENCE TO RELATED APPLICATION

This application claims the priority, under 35 U.S.C. § 119, of German Patent Application DE 10 2020 122 263.7, filed Aug. 26, 2020; the prior application is herewith incorporated by reference in its entirety.

BACKGROUND OF THE INVENTION

Field of the Invention

The present invention relates to an improved method of controlling the quality of printed products.

The technical field of the invention is the field of digital image processing.

In the field of printing caried out by printing machines, different types of defects may occur in a printed product. In order to avoid print defects, image inspection systems identifying such defects are used to be able to counteract the defects and to remove defective sheets. In many cases, the inspection includes a PDF comparison between a camera image and a reference image. Such a PDF comparison between a camera image and a defined reference, which is usually a digital original, is done to indicate deviations in the image relative to the reference. The aim is to avoid defects in the printed product or to display them and deduce suitable counter-measures. Defects on the printed sheet may be caused, for instance, by the printing operation, foreign bodies or defects on the printing plates or blankets, which are required in offset printing. In order to safeguard production, a camera image—the actual image—is created and compared to a digital reference—the target image, during a set-up stage for a print job. As a result of the comparison, the differences are displayed as deviations as a function of the selected parameters.

It is important for a user in the print shop, i.e. an operator of the printing machine, to recognize deviations that are relevant in order to be able to take appropriate measures because, depending on the circumstances, undesired effects that are not to be displayed may occur.

For instance, if the print job does not use homogeneously white printing stock, because lower-cost printing substrates are used for reasons of cost-efficiency, there may be structures or inclusions in the paper that are then likewise displayed as deviations. However, they are not relevant because the user has explicitly decided to use the printing substrate in question and therefore wants them to be filtered out rather than displayed.

So far, in most cases, a parameterization has been modified to the effect that the inspection quality was reduced by adapting the inspection parameters to suppress or at least reduce such printing substrate defects. In most cases, that has been done by increasing tolerances. Yet that may result in a suppression of relevant defects or a continued displaying of undesired paper defects, which are "pseudo-defects" and as such require additional inspection by the operator.

Thus, if lower-quality printing substrates are used, the problem is that additional, non-relevant defects are displayed, which need to be checked and assessed by the operator in addition to the relevant defects. That increases the workload and reduces the transparency of the current status. If there are many deviations, an additional risk is that important deviations may remain undetected or may even not be displayed due to the modification of the parameters.

BRIEF SUMMARY OF THE INVENTION

It is accordingly an object of the invention to provide a method of controlling the quality of printed products by image inspection filtering, which overcomes the hereinafore-mentioned disadvantages of the heretofore-known methods of this general type and which detects print defects in a reliable way and simultaneously reduces the occurrence of pseudo-defects.

With the foregoing and other objects in view there is provided, in accordance with the invention, a method of controlling the quality of printed products by using a computer, wherein a printing machine always produces multiple printed products with at least partially identical image content in the course of a print job to be completed, the printed products are recorded by at least one image sensor and are sent to the computer as digital image data, which are then examined and assessed by the computer in an image inspection process to find print defects, printed products that have been found to be unusable are sorted out, and the computer assesses the identical image content of the digital image data of at least two consecutive printed products and only takes into consideration such detected print defects that are present on the at least two assessed consecutive printed products.

The crucial aspect of the method of the invention is that multiple consecutive printed products are recorded by the image sensor and analyzed by the computer before a decision is made as to whether or not the detected deviations are print defects. In the prior art, every printed product is analyzed on its own, which makes it impossible or at least difficult to detect and ignore pseudo-defects caused for instance by substrate or camera influences. In contrast, the method of the invention checks multiple consecutive printed products for deviations and then analyzes whether the detected deviations occur in all printed products. It is only if this is the case that the computer assumes that a defect is a genuine, systematic print defect because pseudo-defects caused by substrate or camera influences rarely tend to be identical on multiple printed images that have been digitally recorded.

Advantageous and thus preferred further developments of the method of the invention will become apparent from the associated dependent claims and from the description with the associated drawings.

A preferred further development of the method of the invention in this context is that detected print defects which are not present in all of the at least two consecutive printed products are subjected to further analysis in the form of an examination by an operator and/or to a further analysis by the computer. In this analysis the computer checks whether the detected print defects are genuine systematic print defects or only pseudo-defects.

Another preferred development of the method of the invention in this context is that the further analysis by the computer includes the computer checking whether a detected print defect found in the digital image data but not in all of the at least two consecutive printed products has similar values with respect to the x and y positions and to the size in pixels as other detected print defects that are not present in all of the at least two consecutive printed products and wherein in this case all print defects are taken into consideration. The preferred variant of the further analysis resides in a direct analysis of the deviations that have been found in the different recorded printed products in terms of their position in the digitally recorded printed image as well as in terms of their size in pixels. If these aspects are identical or sufficiently similar, the computer assumes that the defects are the same.

A further preferred development of the method of the invention in this context is that the further analysis by the computer includes the computer forming an average with respect to the values of the x and y positions and the size in pixels of multiple print defects which are not present in all of the at least two consecutive printed products and then, as a function of the result of the formation of the average, accordingly no longer takes these print defects into consideration. This represents an alternative to an immediate assessment of the deviations in terms of their position and size. Thus, singular pseudo-defects are subsequently less pronounced and may thus likewise be filtered out. Yet under some circumstances, this may result in an incomplete filtering of these deviations or, in a worst case, it may cause relevant defects to be filtered out.

An added preferred development of the method of the invention in this context is that the computer implements the image inspection process by comparing the digital image data to a digital reference image, in the process generating and analyzing a digital differential image of the digital image data and the digital reference image. This means that in accordance with the invention, what is done first with every consecutive printed product that has been digitally recorded is to create a differential image by a comparison with the reference image. Then the computer checks these differential images for deviations and the detected deviations are analyzed in terms of their similarities or whether they are identical.

An additional preferred development of the method of the invention in this context is that both in the analysis of the digital differential image and in checking the detected print defects in the digital data for similar values, as well as in the formation of the averages, the computer applies predefined tolerance ranges within which objects detected in the differential image do not represent print defects or within which the values of the x and y positions and of the size in pixels of both print defects are similar, and outside of which the multiple print defects which are not present in all of the at least two consecutive printed products and have been subjected to average formation are accordingly no longer taken into consideration. Due to this measure, print defects that are not identical but are similar in their nature to such an extent that a genuine, systematic print defect needs to be assumed rather than an accidental pseudo-defect, can be detected in the process of checking for similar values. For instance, they may be changing defects that are caused, for example, by foreign objects that stick to the printing forme.

Another preferred development of the method of the invention in this context is that in image areas with dynamic image content, the computer always only assesses the image content of one printed product and only implements an assessment of the identical image content of the digital image data of at least two consecutive printed products in the image areas with static image content. Frequently a printed product includes image content that changes dynamically. In digital printing, this may be true for the entire printed image. In offset printing, this may be the case for sheet numbers or the like, or pre-printed areas on the printing substrate in general. In extreme cases, these dynamic areas differ continuously and may thus not be analyzed in accordance with the method of the invention. However, even those printed products may be analyzed in accordance with the invention if the dynamic areas are excluded from continuous examination in an appropriate way. These areas may then be examined in accordance with a prior art method for examining individual printed products.

A concomitant preferred development of the method of the invention in this context is that an inline image recording system disposed downstream of the first printing unit in the printing machine is used as the at least one image sensor. This is the preferred application of the method of the invention. Although a downstream external image inspection may be carried out in accordance with the invention, for reasons of convenience it makes sense to use an image inspection system for quality control that is present anyway in most large industrial printing machines today. In such a case, the computer is preferably identical with the image processing computer of the image recording system rather than with the control unit of the printing machine.

The invention as such as well as further developments of the invention that are advantageous in structural and/or functional terms will be described in more detail below with reference to the associated drawings and based on at least one preferred exemplary embodiment.

Other features which are considered as characteristic for the invention are set forth in the appended claims.

Although the invention is illustrated and described herein as embodied in a method of controlling the quality of printed products by image inspection filtering, it is nevertheless not intended to be limited to the details shown, since various modifications and structural changes may be made therein without departing from the spirit of the invention and within the scope and range of equivalents of the claims.

DETAILED DESCRIPTION OF THE INVENTION

Figure 1:
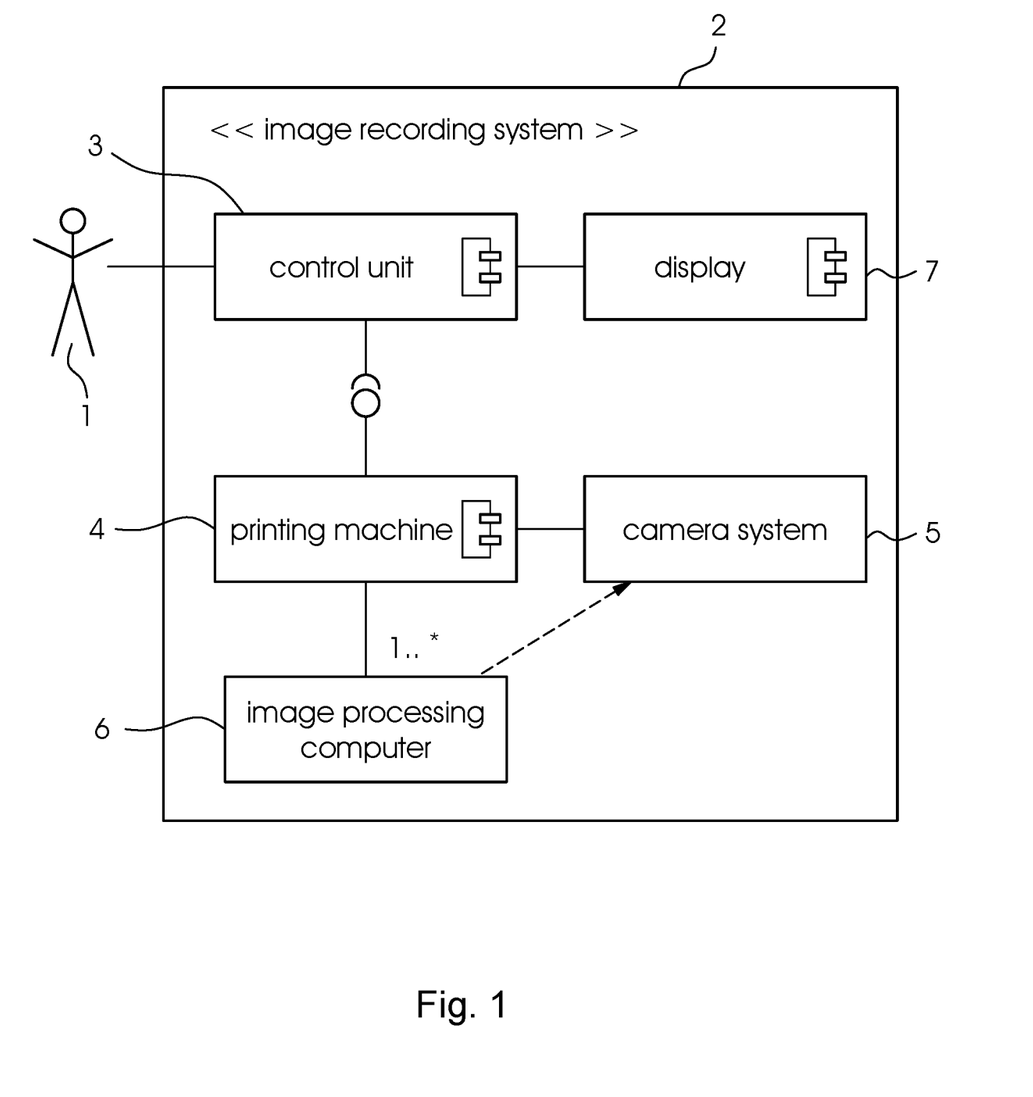
FIG. 1 is a schematic illustration of the image recording system.

Referring now in detail to the figures of the drawings, in which mutually corresponding elements have the same reference symbols, and first, particularly, to FIG. 1 thereof, there is seen an example of an image recording system 2 implementing the method of the invention. The system is formed of at least one image sensor 5, usually a camera 5, which is integrated into a sheet-fed printing machine 4. The at least one camera 5 records the printed images generated by the printing machine 4 and transmits the data to a computer 3, 6 for analysis. This computer 3, 6 may be a separate computer 6, e.g. one or more specialized image processors 6, or it may be identical with the control unit 3 of the printing machine 4. At least the control unit 3 of the printing machine 4 has a display 7 for displaying the results of the image inspection to an operator 1.

Figure 2:
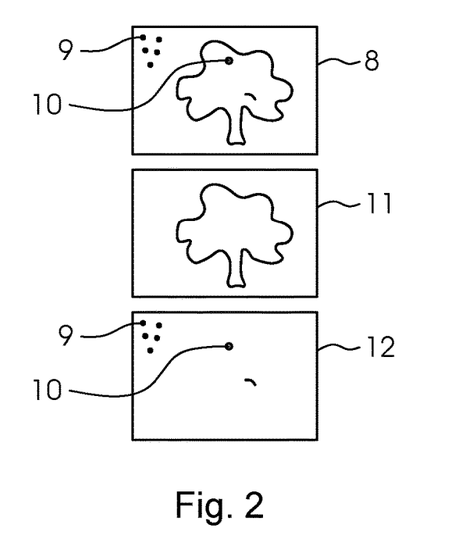
FIG. 2 is a diagrammatic plan view illustrating an example of a comparison between a printed image and a reference image with pseudo-defects.
Figure 6:
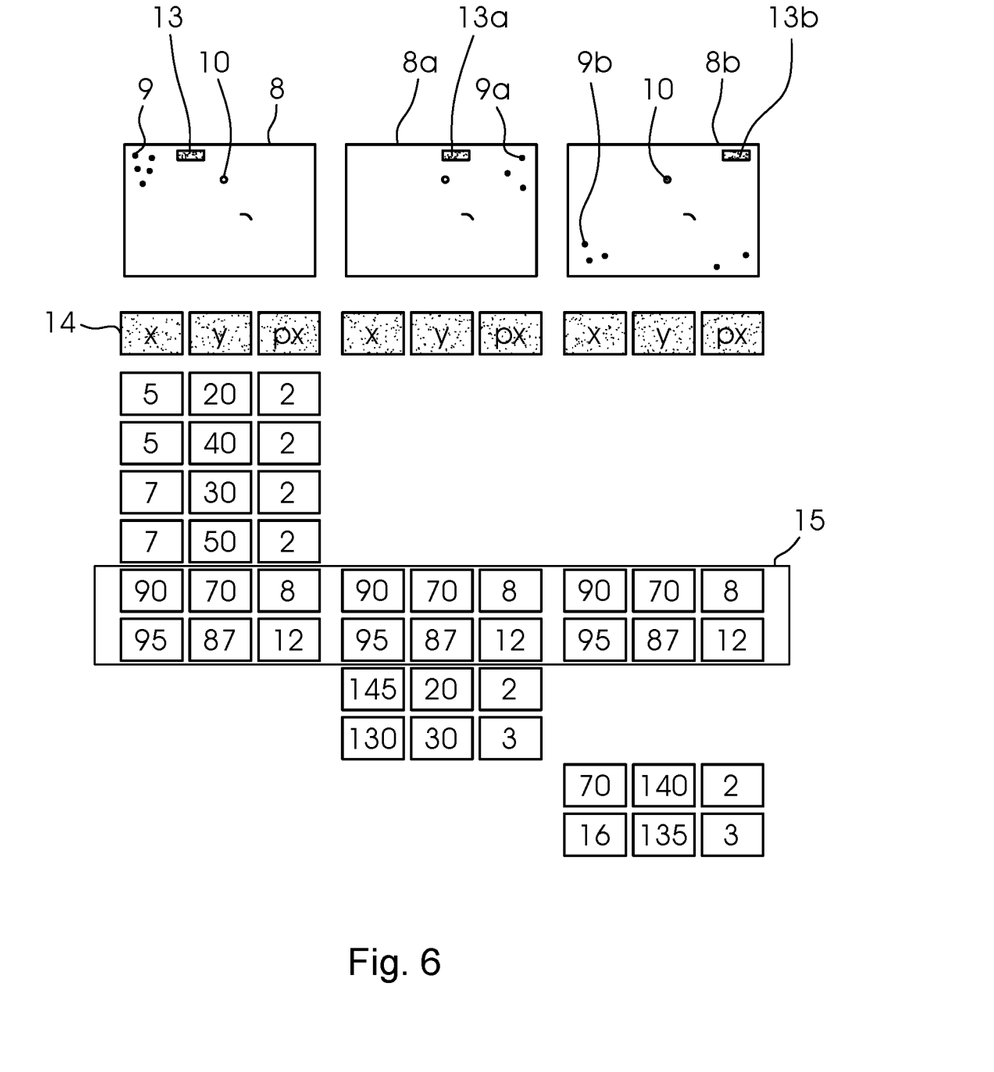
FIG. 6 is a plan view illustrating an example of an identity analysis of individual print defects that have been detected.
Figure 7:
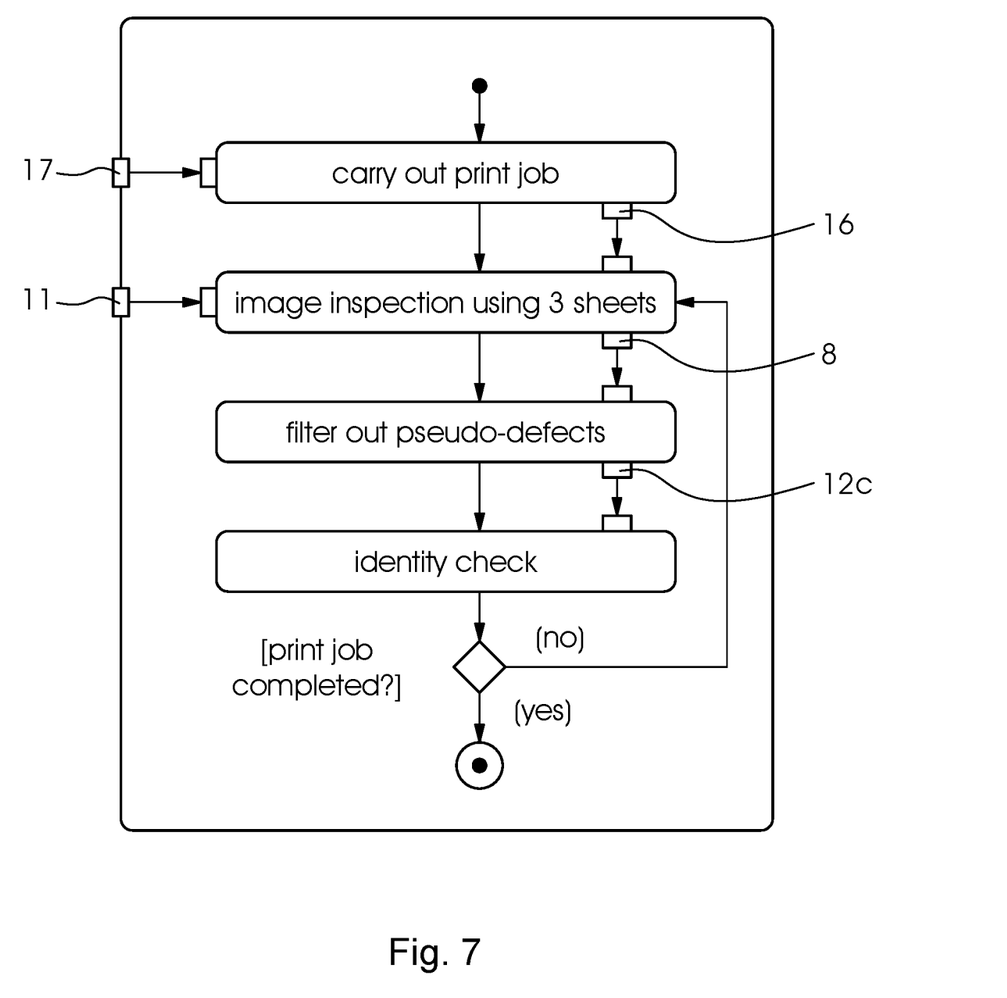
FIG. 7 is a schematic flow chart of the method of the invention.

FIG. 7 is a schematic flow chart of the method of the invention. Instead of an individual camera image 8, the inspection process for the comparison with a reference image 11 is repeated with more than one camera image 8, 8a, 8b shown in FIGS. 2-6. In a subsequent analysis of a resultant differential image 12c, singular effects such as substrate defects 9, 9a, 9b, or image distortions 13, 13a, 13b are dismissed as candidates and only defects that are in the same locations on all camera images 8, 8a, 8b are displayed. In particular, an analysis for sameness 15 in terms of size, position, and shape 14 is to be used at this point. Alternatively, an average may be generated. This does not totally eliminate the undesired effects but at least reduces them sufficiently in terms of their occurrence for them to be filtered out through selected analysis parameters. FIG. 2 illustrates which differences found in the camera image 8 of an individual printed sheet 16 compared to a digitally available reference image 11 are displayed as deviations 9, 10. In accordance with the image inspection, these differences represent print defects 10.

Figure 3:
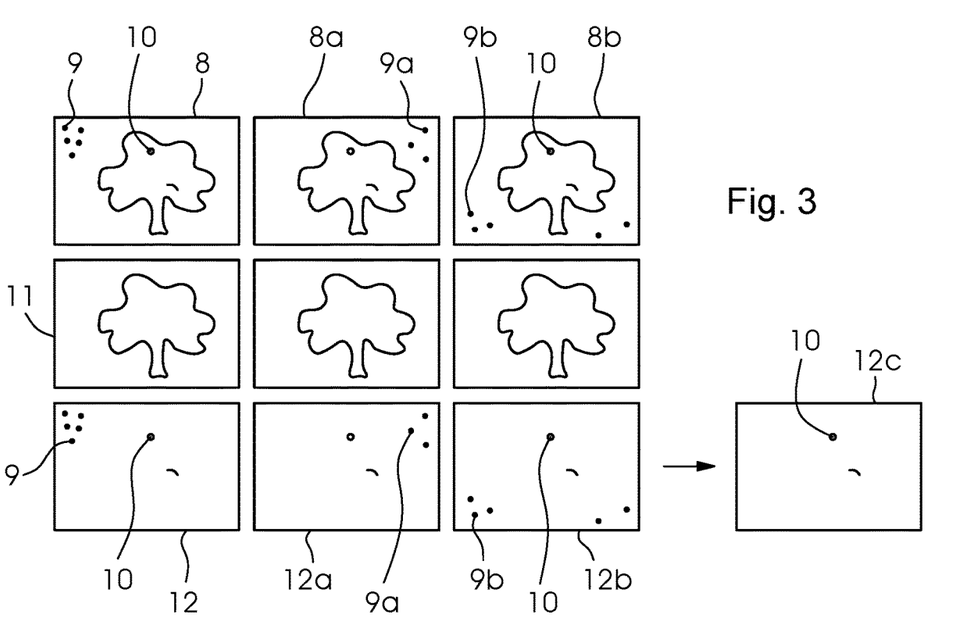
FIG. 3 is a plan view illustrating a comparison in accordance with the invention of three printed images with a reference image for pseudo-defects as well as the end result of the difference analysis of the defect images.

In accordance with the invention, more than one printed image 8, 8a, 8b to be inspected is used for the comparison and the comparison is made for every printed sheet 16, i.e. for the digitized camera images 8, 8a, 8b created by the image recording system. FIG. 3 illustrates an example with three digital printed images 8, 8a, 8b that have been inspected and their corresponding differential images 12, 12a, 12b that have been created by comparing them with the reference image 11. In this process, only those detected deviations 9, 9a, 9b, 10 that are present in all inspected printed images 8, 8a, 8b are marked as genuine print defects 10 in the resultant differential image 12c. The number of printed sheets to be analyzed at once depends on the requirements of the printing machine system 4. The more printed sheets are examined, the more reliably pseudo-defects are filtered out. However, as the number of printed sheets increases, the marginal benefit decreases while at the same time a removal of printed sheets that have genuine print defects 10 becomes impossible if the number of printed sheets is too high because the first printed sheets that have been inspected will already have passed the unusable sheet deflector in the printing machine 4. Logically, for the method to work, all printed sheets to be inspected need to bear the same printed image (pre-print image) 17. If the printed image 17 has dynamic sections that change from printed sheet 8 to printed sheet 8a, 8b, either the inspection needs to be limited exclusively to the static areas or the comparison in accordance with the invention of multiple printed sheets 8, 8a, 8b is only applied to the static area, whereas the image processor 8 inspects the dynamic areas in a conventional way on individual printed sheets 8 only.

Then the detected print defects 9, 9a, 9b, 10 are checked again in a further step to find out whether they are identical. For instance, if a deviation 9, 9a, 9b, 10 has the same values 15 in all differential images 12, 12a, 12b in terms of the x and y positions and in terms of their size 14 in pixels, the image processing computer 6 marks the deviation 9, 9a, 9b, 10 as a detected print defect. If not, the computer 6 dismisses the deviation. FIG. 6 illustrates an identity check on the basis of the example that is provided. In the example, a deviation 10 has the same values 15 in terms of the x and y positions and pixel size 14 and is therefore marked as a print defect.

In addition, an optional further step may additionally recheck the deviations 9, 9a, 9b that only occur in one printed sheet or at least not in all printed sheets. In this process, the image processing computer 6 analyzes the size and position of the individual defects, using specific predefined values for these variables to decide the likelihood that the defects are genuine defects 10. In the first case, they are likewise marked as print defects in a corresponding way. In this way, large individual deviations of relevance such as ink drops that can only be detected every x sheets may for instance be filtered out. They may be defined, for instance, by predefined values and handled in that the image processing computer always marks individual defects of a size greater than x $mm^2$ as print defects irrespective of whether they only occur once or not.

Alternatively, the detection of undesired artifacts is possible by forming an average over the multiple printed sheet images 8, 8a, 8b. In this process, singular defects are subsequently less pronounced and may likewise be filtered out with the aid of suitable parameters. In some circumstances, however, this may cause such deviations 9, 9a, 9b to be incompletely filtered out or, in a worst case, it may cause relevant defects to be filtered out because of the selected parameters.

Figure 4:
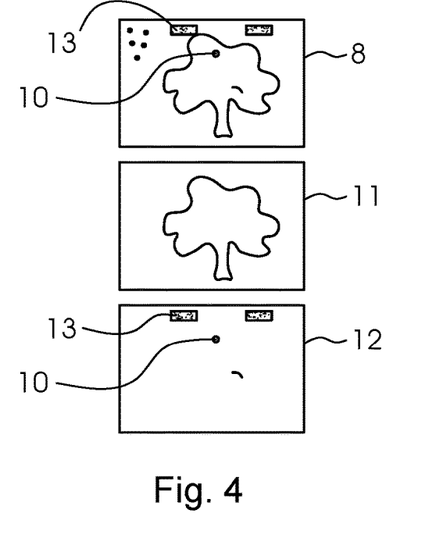
FIG. 4 is a plan view illustrating an example of a comparison between a printed image and a reference image with dynamic defects.
Figure 5:
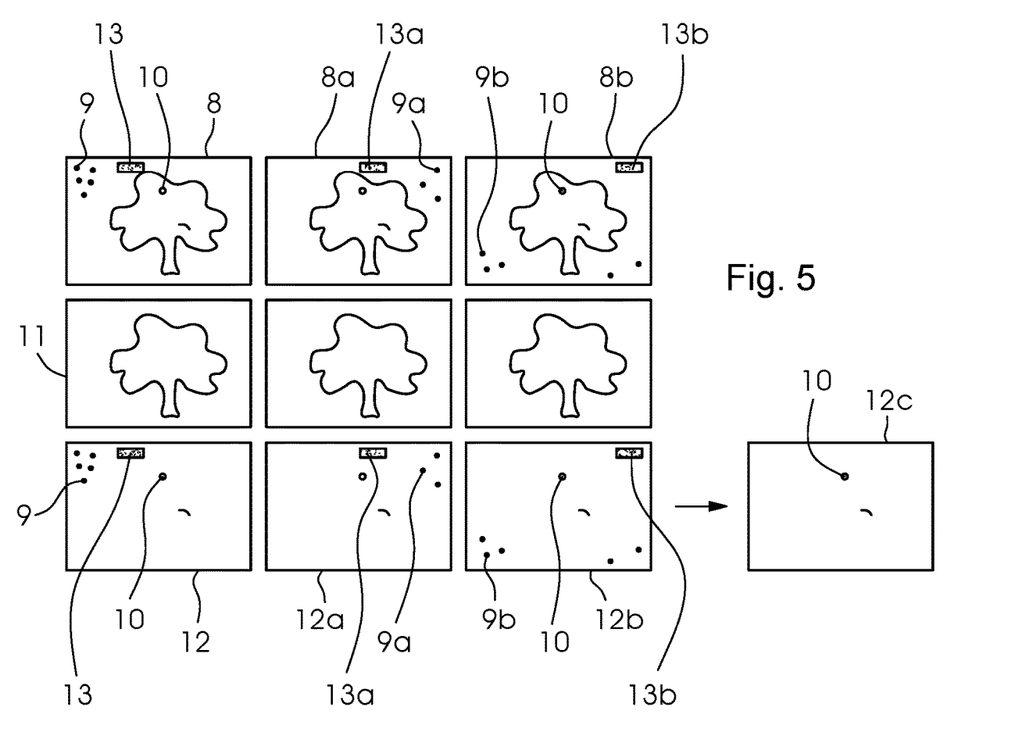
FIG. 5 is a plan view illustrating a comparison in accordance with the invention between the reference image and three printed images with dynamic defects as well as the end result of the difference analysis of the defect images.

Apart from detecting pseudo-defects that are due to low-quality printing materials, the same method may be used to filter out undesired image distortions 13, 13a, 13b as pseudo-defects, for instance distortions that may have been created in the camera recording by movements as the printed sheet is being transported, e.g. edge noise, shadows, or the like. FIG. 4 illustrates this case for the prior art method with one printed sheet to be inspected. FIG. 5 illustrates the method of the invention for this case.

Further examples of additions to the method of the invention include the following:

A configuration may allow operators to choose whether they want to use only one printed sheet 8 as in the prior art, for instance when dealing with pharmaceutical products, which generally use high-quality printing substrates. In this case, areas with dynamic elements may be marked to indicate areas where the image processing computer 6 compares only one printed sheet 8 like in the conventional method, whereas for the remaining, static areas multiple print sheets 8, 8a, 8b are compared in accordance with the invention.

If required, for instance if the quality of the printing substrates changes, the operator may choose the number of print sheets to be compared with the desired reference 11. The default value is three printed sheets/images 8, 8a, 8b.

Thus, the invention basically includes using more than one camera image 8, 8a, 8b, for instance on three printed sheets, in a comparison of a camera image 8 with a digital reference 11. Since in contrast to genuine print defects 10, the structures or inclusions in the printing substrate 9, 9a, 9b are randomly distributed and never in the same way, such deviations may be filtered out on the basis of the frequency of their occurrence in a location. Deviations 10 that are relevant to the printing operation and thus repeat on every sheet may nevertheless be reliably identified. This method reduces the detected deviations 9, 9a, 9b, 10, 13, 13a, 13b down to the deviations 10 that are relevant to the operator and thus saves time for checks of superfluous measures. For instance, if a PDF inspection does not find any deviations 10 that are relevant to the printing operation but for instance 100 deviations 9, 9a, 9b that are due to the quality of the selected printing material, in the past an operator would have had to analyze all 100 paper defects 9, 9a, 9b. The invention makes analysis in these cases unnecessary and therefore considerably reduces set-up times.

In general, the advantages of the invention include:
1. It is only relevant deviations 10 which are displayed in the comparison between a camera image 8 of printed sheets and a reference 11.
2. The analysis by an operator is thus much faster.
3. In a best-case scenario, no deviations 9, 9a, 9b, 10 are displayed, for instance if there are only deviations 9, 9a, 9b that are due to the utilized printing substrate.
4. In addition, undesired pseudo-defects 13, 13a, 13b caused by movement of the sheet may be filtered out in this way.
5. A PDF comparison of more than one print sheet (e.g. 3 sheets) as a filtered result results in lower requirements, such as for paper quality.

The following is a summary list of reference numerals and the corresponding structure used in the above description of the invention:

1 operator
2 image recording system
3 control unit
4 printing machine
5 image sensor/camera system
6 image processing unit
7 display
8 camera image (printed image)
8a, 8b consecutive camera images (printed image)
9 random image deviation due to substrate defects
9a, 9b continuous substrate defects
10 genuine print defect
11 reference image
12 differential image
12a, 12b consecutive differential images
12c resultant differential image
13 random image deviation due to image distortion
13a, 13b consecutive image distortions
14 x, y positions and pixel size of the image deviations
15 identical values for x, y positions and pixel size
16 printed image
17 digital pre-print image (print image)

The invention claimed is:

1. A method of controlling the quality of printed products, the method comprising:

using a printing machine to always produce multiple printed products with an at least partially identical image content in a course of a print job to be completed;

using at least one image sensor to record the multiple printed products and send the recorded multiple printed products to a computer as digital image data;

using the computer to examine and assess the digital image data in an image inspection process to find print defects and to sort out printed products having been found to be unusable;

using the computer to assess the identical image content of the digital image data of at least two consecutive printed products and only take into consideration such detected print defects being present on the at least two assessed consecutive printed products;

subjecting detected print defects not being present in all of the at least two consecutive printed products to further analysis being at least one of an examination by an operator or a further analysis by the computer; and carrying out the further analysis by the computer by using the computer to form an average with respect to values of x and y positions and size in pixels of multiple print defects not being present in all of the at least two consecutive printed products and then, as a function of a result of a formation of an average, accordingly no longer taking these print defects into consideration.

2. The method according to claim 1, which further comprises using the computer to implement the image inspection process by comparing the digital image data to a digital reference image, and generating and analyzing a digital differential image of the digital image data and the digital reference image.

3. The method according to claim 2, which further comprises using the computer, both in the analysis of the digital differential image and in checking the detected print defects in the digital image data for similar values, as well as in the formation of the averages, to apply predefined tolerance ranges within which objects detected in the differential image do not represent print defects or within which the values of the x and y positions and of the size in pixels of both print defects are similar, and outside of which the multiple print defects not being present in all of the at least two consecutive printed products and having been subjected to average formation are accordingly no longer taken into consideration.

* * * * *